United States Patent Office 2,782,182
Patented Feb. 19, 1957

2,782,182

PROCESS FOR INTERPOLYMERIZATION OF MALEIC ANHYDRIDE WITH VINYL ALKYL ETHERS

Robert M. Verburg, North Plainfield, N. J., assignor to General Aniline & Film Corporation, New York, N. Y., a corporation of Delaware No Drawing. Application October 30, 1951, Serial No. 253,958

4 Claims. (Cl. 260—78.5)

This invention relates to an improved process for interpolymerizing maleic anhydride with vinyl alkyl ethers, preferably lower alkyl (1–5 carbon atoms) vinyl ethers and more preferably methyl vinyl ether.

The production of the interpolymers of vinyl alkyl ethers with maleic anhydride by heating a mixture thereof with a small amount of a peroxide polymerization catalyst is known in the art and the thus obtained interpolymers have numerous valuable technical applications.

I have now found that by adding to the mixture of vinyl alkyl ether and maleic anhydride to be interpolymerized, a small amount of a previously prepared interpolymer of the same vinyl alkyl ether and maleic anhydride that a higher molecular weight product may be obtained and that the polymerization will proceed much more rapidly. It is also possible to substantially reduce the amount of peroxide polymerization catalyst employed for the reaction.

The details of the present invention will be apparent from a consideration of the following specific examples in which the parts are by weight.

Example I 1 part of maleic anhydride and 1 part of methly vinyl ether were dissolved in 3.8 parts of benzene. To the resulting solution there was added 0.125 percent lauryl peroxide based on the amount of monomer used. The solution was heated at 60° C. for ten hours and quantitative yields of an interpolymer having a specific viscosity of about 3.0 were obtained.

An identical mixture of 1 part of maleic anhydride and 1 part of methyl vinyl ether in 3.8 parts of benzene was prepared. To this solution there was then added 0.125 percent lauryl peroxide based on the amount of monomer used and in addition, 0.3 percent based on the total charge of the interpolymer prepared as described in the preceding paragraph was added. This solution was heated to 60° C. during which the reaction proceeded with violence. In approximately 30 minutes a yield of 80 percent of theory of interpolymer having a specific viscosity of approximately 1.0 was obtained.

Example II 1 part of maleic anhydride and 1 part of methyl vinyl ether were diluted with 3.8 parts of benzene. To the thus obtained solution there was added 0.3 percent, based on the total charge, of the interpolymer prepared under paragraph 1 of Example I. The charge was heated to about 60° C. for ten hours until a small amount of interpolymer was formed. There was then added 0.063 percent of lauryl peroxide based on the amount of monomer charge. The reaction was controlled with difficulty at 60° C. and at the end of heating for ten hours at 60° C. a quantitative yield of interpolymer having a specific viscosity of approximately 7.0 was obtained.

Example III 1 part of maleic anhydride and 1 part of methyl vinyl ether were diluted with 3.8 parts of benzene. To the thus obtained solution there was added 0.03 percent lauryl peroxide based on the monomer charge and 0.7 percent of the interpolymer prepared in paragraph 1 of Example I. The charge was heated at 60° C. for ten hours. A yield of approximately 75 percent of the theory was obtained of an interpolymer having a specific viscosity of approximately 5.0.

Example IV 1 part of a maleic anhydride and 1 part of methyl vinyl ether were diluted with 3.8 parts of benzene and to the thus obtained solution there was added 0.03 percent lauryl peroxide based on the monomer charge. The solution was heated at 60° C. for 10 hours at which time the sample was withdrawn and it was found that approximately 2 percent of the theoretical yield of interpolymer had been obtained. There was then added to the charge 0.7 percent based on the total charge of the interpolymer prepared in Example I, paragraph 1. The charge was then heated for an additional ten hours at 60° C. and there was obtained a quantitative yield of interpolymer having a specific viscosity of approximately 8.

Considering the foregoing examples it will be apparent from a comparison of Example I, first paragraph, which is a typical illustration of the prior art, with Example I, second paragraph, that by the use of the previously prepared polymer as a catalyst in accordance with the present invention the speed of the reaction is substantially increased. However, from a comparison of Example II with Example I, it will be apparent that in carrying out the present process it is frequently preferable to decrease the amount of peroxidic polymerization catalyst in accordance with the present invention, together with a smaller amount of the prior art peroxidic catalyst than that formerly used, the violence of the reaction may be modified and an interpolymer having a higher viscosity, which will ordinarily be preferred, may be obtained.

From a consideration of Example III as compared with Example IV, it will be noted that the reduced amount of peroxidic catalyst employed in Example III, which is substantially the minimum amount which may be used to effect quantitative yield of desired interpolymer, is by itself insufficient to effect complete polymerization. However, when this smaller amount of peroxidic catalyst is employed in the process of the present invention along with a previously prepared interpolymer catalyst or activator, it will be noted that the reaction is substantially quantitative. It will also be noted that a higher viscosity product is obtained when the reaction is effected in accordance with the present invention.

The exact manner in which the previously prepared interpolymer, which is employed as a catalyst in practicing the present invention, functions has not been determined. It is possible that, in the interpolymerization of vinyl alkyl ethers and maleic anhydride using a peroxide catalyst, some form of peroxide of the copolymer may be formed in reaction and that the thus formed peroxide is effectively a potent catalyst for this reaction. If so, it appears probable that such peroxide of the copolymer is formed slowly during the reaction, reaching its maximum concentration at the end of the polymerization so that it was without substantial effect on the polymerization as heretofore carried out. However, by adding previously prepared interpolymer to a mixture of vinyl alkyl ether and maleic anhydride to be polymerized as described herein, the entire polymerization is catalyzed effectively. It should be understood that the foregoing is offered merely as a possible explanation of the manner of operation of the present invention; however, it has not been established and therefore the present application is not to be limited to any theory of operation.

It will be understood that the foregoing examples are illustrative only of the present invention and various modifications may be made therein without departing from the scope thereof. In particular, such reaction conditions as the temperature employed for the polymerization and the amount of peroxide catalyst employed may be varied within the ranges heretofore used. Other peroxide catalysts, such as hydrogen peroxide, benzoyl peroxide, cumene hyperoxide, tert.-butyl hyperoxide, di-tert. butyl peroxide, etc., may be used in place of the lauroyl peroxide illustrated in the examples. However, at any given polymerization conditions of temperature, peroxide catalyst concentration and specific peroxide catalyst, it has been found that an interpolymer having a higher viscosity is obtained when previously prepared interpolymer is employed as the catalyst than is obtained under similar conditions in the absence of such previously prepared interpolymer. The effect of variations (in temperature, peroxide catalyst concentration and specific peroxide catalyst) in practicing the present invention are substantially parallel to the effect of variations of these reaction conditions in the prior art polymerization of vinyl ethers and maleic anhydride. Thus, the viscosity of the product varies inversely as the temperature and the concentration of peroxide employed. The requisite conditions (of temperature, peroxide catalyst concentration and specific peroxide catalyst) for the production of interpolymer of desired viscosity may be readily determined by simple preliminary experiments.

It will also be noted that vinyl alkyl ethers and maleic anhydride interpolymerize in equal (1:1) molar proportions. Therefore, it is preferable, in carrying out this interpolymerization in accordance with the present invention, to employ substantially equimolar proportions of these two monomers as illustrated in the specific examples. However, a molar excess of vinyl alkyl ethers or the anhydride may be employed, if desired. Such excess, however, does not react but may effect the viscosity of the product obtained.

While the interpolymer of maleic anhydride and methyl vinyl ether has been specifically described in the foregoing examples, it should be understood that other alkyl vinyl ethers, particularly other lower alkyl vinyl ethers in which the alkyl group contains from 1 to 5 carbon atoms, may be employed without other change in the reaction conditions. As examples of such other alkyl vinyl ethers may be mentioned ethyl vinyl ether, propyl vinyl ether, isopropyl vinyl ether, n-butyl vinyl ether, secondary butyl vinyl ether and amyl vinyl ethers. It will also be understood that, if desired, a mixture of two or more of the foregoing vinyl alkyl ethers may be interpolymerized with maleic anhydride.

I claim:

1. In the process of interpolymerizing vinyl alkyl ethers and maleic anhydride to produce interpolymers thereof wherein a solution of a mixture of a vinyl alkyl ether containing 1 to 5 carbon atoms in the alkyl group and maleic anhydride in an inert organic solvent therefor is subjected to the action of a peroxide polymerization catalyst to thereby effect interpolymerization thereof, the improvement which comprises incorporating in the reaction mixture as an additional catalyst for said interpolymerization a minor amount of a previously prepared interpolymer of such vinyl alkyl ether and maleic anyhydride.

2. The process as defined in claim 1 wherein the inert organic solvent specified is benzene.

3. In the process of interpolymerizing methyl vinyl ether and maleic anhydride to produce interpolymers thereof, wherein a solution of a mixture of methyl vinyl ether and maleic anhydride in an inert organic solvent therefor is subjected to the action of a peroxide polymerization catalyst to thereby effect interpolymerization thereof, the improvement which comprises incorporating in the reaction mixture as an additional catalyst for said interpolymerization a minor amount of a previously prepared interpolymer of such methyl vinyl ether and maleic anhydride.

4. The process as defined in claim 3, wherein the inert organic solvent specified is benzene.

References Cited in the file of this patent

UNITED STATES PATENTS

| | | |
|---|---|---|
| 2,047,398 | Voss et al. | July 14, 1936 |
| 2,537,334 | De Nie | Jan. 9, 1951 |
| 2,675,370 | Barrett | Apr. 13, 1954 |